(No Model.)
P. E. L. PERDRIZET.
GLOVE FASTENER.
No. 565,560. Patented Aug. 11, 1896.
FIG. 1. FIG. 2.
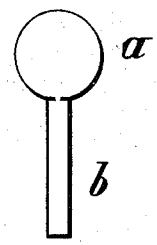 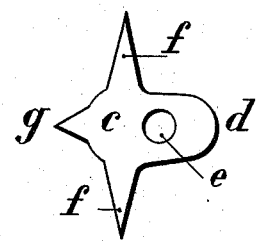
FIG. 3. FIG. 4. FIG. 5.
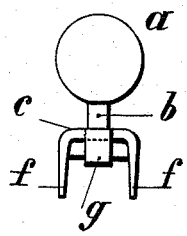 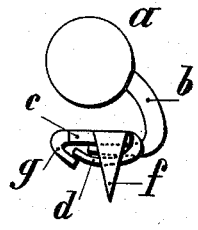 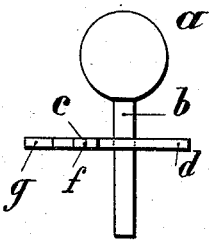
FIG. 6. FIG. 7. FIG. 8.
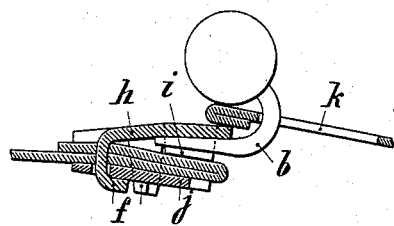 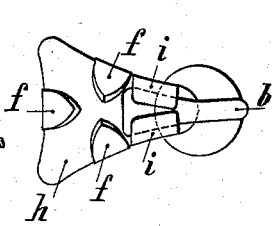 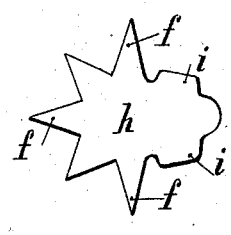
Witnesses:
L. M. Wachschlager,
George Moore.
Inventor
Paul E. L. Perdrizet,
By Briesen & Knauth
his Attorneys.

UNITED STATES PATENT OFFICE.

PAUL EMILE LÉON PERDRIZET, OF PARIS, FRANCE.

GLOVE-FASTENER.

SPECIFICATION forming part of Letters Patent No. 565,560, dated August 11, 1896.

Application filed January 20, 1896. Serial No. 576,078. (No model.)

*To all whom it may concern:*

Be it known that I, PAUL EMILE LÉON PERDRIZET, of the city of Paris, France, have invented a new System of Hooked Fastener for Gloves, of which the following is a full, clear, and exact description.

This invention relates to a new system of hooked fastener for gloves; and it consists in the construction hereinafter pointed out and claimed.

In order that my new fastener may be more readily understood, I will now describe it in reference to the accompanying drawings, in which—

Figure 1 shows the stem and head or top of the hooked fastener apart from the base. Fig. 2 shows the base apart from the head. Fig. 3 shows the stem introduced into the base. Fig. 4 is a side view of the complete hooked fastener. Fig. 5 is a face view of same. Figs. 6 and 7 show in vertical section and in plan from underneath a modification of my device. Fig. 8 shows the stamped piece which will constitute the base in this last case.

The same letters of reference denote like parts in all the figures.

According to the drawings, my improved hooked fastener is provided with a pearl-shaped head or top $a$, which is made of any convenient material fused on a steel stem $b$, the section of which may be circular or of any other form. The base $c$ of the hook is stamped from a brass sheet and is preferably of the form shown in Fig. 2 of the drawings.

In order to make my hooked fastener, the stem $b$ is introduced in the hole $e$ of the base and then flattened. The tongue $d$ is then turned up upon the stem and pressed thereupon by means of a stamping-press or any other suitable means. The part of the stem which has been introduced in the hole $e$ increases in width by the flattening, and thus is prevented from leaving the hole. Moreover, said stem is firmly secured, as it is kept by the tongue or wings $d$, and is also pressed in the metal by the stamping-press. After this the hook is finished by giving to the upper part of the stem the necessary curve to form the hook proper. In order to prevent the tongue from straightening, I may also fold up the prong $g$ upon the tongue, as shown in Fig. 4. The tangs $f$ are perpendicularly folded, as shown in Figs. 3 and 4, and after being passed through the glove those tangs are clenched in order to secure the hook upon the glove.

My improved hooked fastener, on account of its particular arrangement, may be applied as well to the fastening of laced or buttoned gloves.

Figs. 6 to 8 show a modification of the mode of fixing of my improved hooked fastener, which said device is especially applicable to gloves. The base employed in such case is stamped, as shown in Fig. 8, from a brass sheet $h$ in order to present two wings $i$, which, when turned down upon the flattened end of stem $b$, maintain it firmly without necessitating welding, and three prongs $f$, which allow the hook to be clasped upon the glove. Instead of simply turning up these prongs $f$ on the material of the glove, a washer $j$ may be employed, as shown in Fig. 6, in order to impart stiffness to the whole.

The "hooked fastener" is engaged in a buttonhole $k$, provided for that purpose, as shown in Fig. 6.

On account of the disposition of its top, my improved hooked fastener prevents the glove from becoming undone, although allowing it to be readily buttoned up and unbuttoned. The part $h$ is stamped in such a manner that when the wings $i$ and prongs $f$ are turned down said part may present a decorative device of any shape.

The forms, details, accessories, sizes, and materials of my improved hooked fastener may obviously be varied without altering in any way the principle of my invention. I can also apply my improved hooked fastener to dress articles of any kind.

I claim—

1. As a new and useful article of manufacture, the herein-described glove-fastening comprising the bent metallic stem $b$ having its lower end flattened, a metallic base receiving the stem and having prongs adapted to enter the glove and one or more tongues or wings engaging the flattened portion of the stem to hold the said base and stem together, and a head or top on the free end of the stem $b$.

2. As a new and useful article of manufacture, the herein-described glove-fastener comprised of two parts, to wit: a headed stem $b$ $a$, an apertured base-plate $c$ provided with entering prongs $f$ and a tongue $d$, the said stem and base-plate being secured together.

The foregoing specification of new system of hooked fastener for gloves signed by me this 31st day of December, 1895.

PAUL EMILE LÉON PERDRIZET.

Witnesses:
CLYDE SHROPSHIRE,
ALBERT MOREAU.